(12) United States Patent
Zhou et al.

(10) Patent No.: US 12,070,994 B2
(45) Date of Patent: Aug. 27, 2024

(54) BATTERY PACK AND ELECTRIC APPARATUS

(71) Applicant: TSINGHUA UNIVERSITY, Beijing (CN)

(72) Inventors: Qing Zhou, Beijing (CN); Po-Wen Chen, Beijing (CN); Yong Xia, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 320 days.

(21) Appl. No.: 17/560,278

(22) Filed: Dec. 23, 2021

(65) Prior Publication Data
US 2023/0059786 A1 Feb. 23, 2023

(30) Foreign Application Priority Data
Aug. 20, 2021 (CN) .......................... 202110961013.5

(51) Int. Cl.
*B60K 1/04* (2019.01)
*B60L 50/60* (2019.01)
(Continued)

(52) U.S. Cl.
CPC ................ *B60K 1/04* (2013.01); *B60L 50/64* (2019.02); *B60L 50/66* (2019.02);
(Continued)

(58) Field of Classification Search
CPC ........... B60K 1/04; B60L 50/64; B60L 50/66; H01M 50/208; H01M 50/242
See application file for complete search history.

(56) References Cited

U.S. PATENT DOCUMENTS

| 11,691,709 B1* | 7/2023 | Donovan | ................ B60L 58/26 188/377 |
| 2018/0114960 A1 | 4/2018 | Sato et al. | |

(Continued)

FOREIGN PATENT DOCUMENTS

| CN | 107017369 A | 8/2017 |
| CN | 107658393 A | 2/2018 |

(Continued)

OTHER PUBLICATIONS

OA1 for Chinese Application No. 202110961013.5 dated Apr. 22, 2020 (8 pages).

(Continued)

*Primary Examiner* — Jason D Shanske
*Assistant Examiner* — James J Triggs (57) ABSTRACT

A battery pack is provided, including at least one layer of battery cells in a height direction thereof. Each layer of battery cells includes either or both of a plurality of rows and a plurality of columns of battery cells. The battery cells in each row are arranged end-to-end in a length direction of the battery pack. The rows are arranged in a width direction of the battery pack. At least a part of the battery cells in each row are staggered with corresponding battery cells in an immediately adjacent row of battery cells. The battery cells in each column are arranged end-to-end in the width direction of the battery pack. The columns are arranged in the length direction of the battery pack. At least a part of the battery cells in each column are staggered with corresponding battery cells in an immediately adjacent column of battery cells.

14 Claims, 6 Drawing Sheets

(51) Int. Cl.
  *B60L 50/64* (2019.01)
  *H01M 50/209* (2021.01)
  *H01M 50/242* (2021.01)

(52) U.S. Cl.
  CPC ....... *H01M 50/209* (2021.01); *H01M 50/242* (2021.01); *B60K 2001/0438* (2013.01)

(56) References Cited

U.S. PATENT DOCUMENTS

| | | | |
|---|---|---|---|
| 2021/0167453 A1* | 6/2021 | Kawakami | H01M 50/213 |
| 2022/0216567 A1* | 7/2022 | Sueyoshi | H01M 50/24 |
| 2022/0320651 A1* | 10/2022 | Yang | H01M 10/6556 |
| 2023/0058402 A1* | 2/2023 | Schreiber | H01M 10/0525 |

FOREIGN PATENT DOCUMENTS

| | | |
|---|---|---|
| CN | 108110152 A | 6/2018 |
| CN | 209544438 U | 10/2019 |
| CN | 210403848 U | 4/2020 |
| CN | 213150935 U | 5/2021 |
| CN | 113051721 A | 6/2021 |
| KR | 20120116829 A | 10/2012 |

OTHER PUBLICATIONS

OA2 for Chinese Application No. 202110961013.5 dated Jul. 12, 2020 (9 pages).

Shi Yue: "Analysis and Survey of Small Lightweight Electric Vehicle Crash Safety", «Chinese Master's Theses Full-text Database», Dec. 15, 2015.

* cited by examiner

BATTERY PACK AND ELECTRIC APPARATUS

CROSS-REFERENCE TO RELATED APPLICATION

This application claims priority of China Patent Application No. 202110961013.5, filed on Aug. 20, 2021, entitled "BATTERY PACK AND ELECTRIC APPARATUS", the content of which is hereby incorporated by reference in its entirety.

TECHNICAL FIELD

The present disclosure relates to battery packs and electric apparatuses.

BACKGROUND

A battery pack, as a power source of an electric vehicle, is generally integrated onto an undercarriage of a vehicle body. In recent years, the volume of the battery pack has been increasing in order to achieve a longer driving range of the electric vehicle. The undercarriage of the vehicle body is usually lowered, so as to provide more space for the larger battery pack without reducing the interior volume of the electric vehicle or increasing the overall height of the electric vehicle. As a result, a distance from the undercarriage of the vehicle body to the ground is reduced, which makes it easier for undercarriage collision to occur. The impact on the undercarriage of the vehicle in the collision could deform the battery pack, which may cause a short circuit and thermal runaway of the battery pack.

SUMMARY

In view of this, there is a need to provide a battery pack and an electric apparatus.

A battery pack includes at least one layer of battery cells in a height direction of the battery pack. Each of the at least one layer of battery cells includes either or both of a plurality of rows of battery cells and a plurality of columns of battery cells. The battery cells in each of the plurality of rows are arranged end-to-end in a length direction of the battery pack. The plurality of rows are arranged in a width direction of the battery pack. At least a part of the battery cells in each of the plurality of rows are staggered with respect to corresponding battery cells in an immediately adjacent row of battery cells. The battery cells in each of the plurality of columns are arranged end-to-end in the width direction of the battery pack. The plurality of columns are arranged in the length direction of the battery pack. At least a part of the battery cells in each of the plurality of columns are staggered with respect to corresponding battery cells in an immediately adjacent column of battery cells.

An electric apparatus includes the above-described battery pack.

In the present disclosure, when the vehicle is subjected to a side pole impact or an undercarriage collision, due to the above-described staggered arrangement of the battery cells in the battery pack, the battery cells are more likely to deform or move, such as bend, rotate, shift, etc., causing the external impact energy transferred to a wider range throughout the battery cells, rather than concentrated in the impact zone. The diffusion of impact energy will alleviate the damage of the impact zone of battery pack. As a result, the risk of break, short circuit, and thermal runaway of the battery pack can be reduced, improving the safety performance of the battery pack.

DETAILED DESCRIPTION

The present disclosure will now be described in detail with reference to the accompanying drawings and embodiments in order to make the objects, technical solutions, and advantages of the present disclosure more clear. It should be understood that the specific embodiments described herein are only for explaining the present disclosure, and are not intended to limit the present disclosure.

In the description of the present disclosure, it is to be understood that terms such as "central", "upper", "lower", "front", "rear", "left", "right", "vertical", "horizontal", "top", "bottom", "inner", "outer", should be construed to refer to the orientation as shown in the drawings. These relative terms are for convenience of description and do not require that the present disclosure be constructed or operated in a particular orientation.

In addition, terms such as "first" and "second" are used herein for purposes of description and are not intended to indicate or imply relative importance or significance or to imply the number of indicated technical features. Thus, features limited by "first" and "second" are intended to indicate or imply including one or more than one of these features. Further, in the description of the present disclosure, "a plurality of" means two or more than two, unless specified otherwise.

In the description of the present disclosure, it should be understood that, unless specified or limited otherwise, the terms "mounted", "connected", "coupled" and variations thereof are used broadly and encompass such as mechanical or electric mountings, connections and couplings, also can be inner mountings, connections and couplings of two components, and further can be direct and indirect mountings, connections, and couplings, which can be understood by those skilled in the art according to the particular embodiment of the present disclosure.

In the present disclosure, unless specified or limited otherwise, a structure in which a first feature is "on" or "below" a second feature can include an embodiment in which the first feature is in direct contact with the second feature, and can also include an embodiment in which the first feature and the second feature are not in direct contact with each other, but are connected via an additional feature disposed therebetween. Furthermore, a first feature "on", "above", or "on top of" a second feature may include an embodiment in which the first feature is right or obliquely "on", "above", or "on top of" the second feature, or just means that the first feature is at a height higher than that of the second feature; while a first feature "below", "under", or "on bottom of" a second feature may include an embodiment in which the first feature is right or obliquely "below", "under", or "on bottom of" the second feature, or just means that the first feature is at a height lower than that of the second feature.

It is to be understood that when an element is referred to as being "fixed" or "disposed" on another element, it can be directly on the other element or intervening elements may be present. When an element is referred to as being "connected" to another element, it can be directly connected to the other element or intervening elements may be present. The terms "vertical", "horizontal", "upper", "lower", "left", "right" and other similar expressions used herein is for the purpose of describing particular embodiments only and is not intended to be limiting of the present disclosure.

Figure 1:
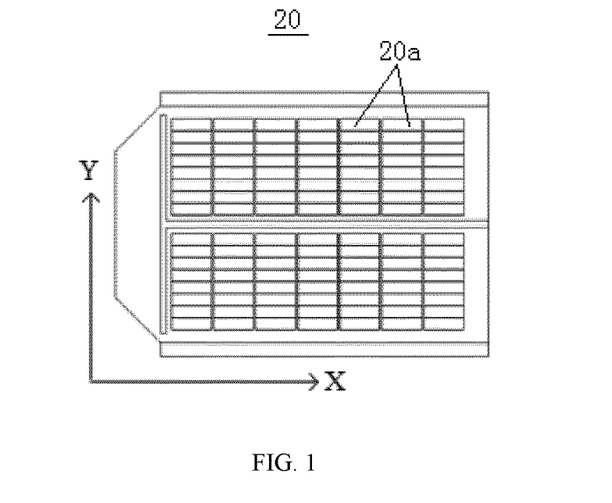
FIG. 1 is a schematic top view of a battery pack in related art.
Figure 2:
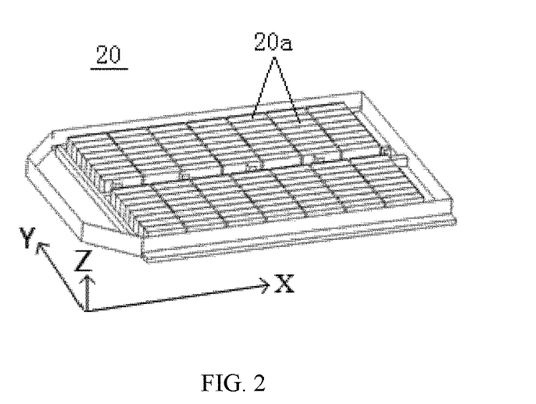
FIG. 2 is a schematic perspective view of the battery pack of FIG. 1.
Figure 3:
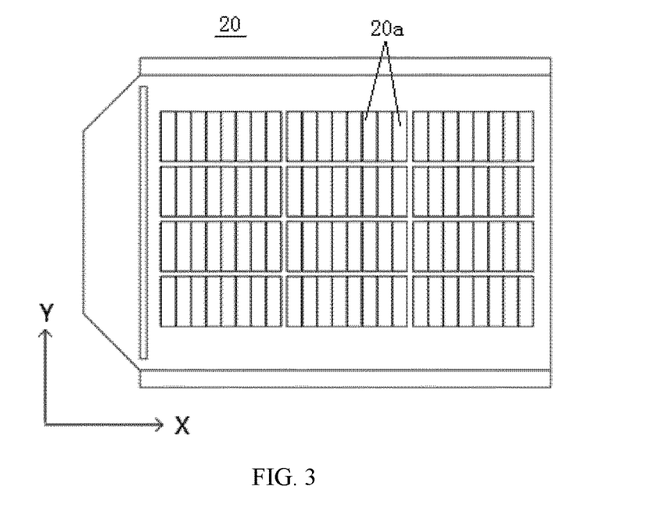
FIG. 3 is a schematic top view of another battery pack in related art.

A battery pack, as a power source of an electric vehicle, is mainly assembled from a plurality of battery cells and/or a plurality of battery modules each including a plurality of battery cells. The battery pack is generally integrated onto an undercarriage of the electric vehicle body. In related art, the battery cells 20a in a battery pack 20 are arranged in an array in which the battery cells 20a are aligned with each other in both a length direction X and a width direction Y of the battery pack 20, as shown in FIGS. 1 to 3.

In recent years, the volume of the battery pack is increasing in order to achieve a longer driving range of the electric vehicle. In that case, the undercarriage of the vehicle body is usually lowered, so as to provide more space for the larger battery pack while not to reduce the inner space of the electric vehicle and not to increase the overall height of the electric vehicle. As a result, a distance from the undercarriage of the vehicle body to the ground is reduced, which makes the undercarriage collision easy to occur. The impact on the undercarriage in the collision may cause deformation of the battery pack, which may in turn cause short circuit and thermal runaway of the battery pack.

Figure 4:
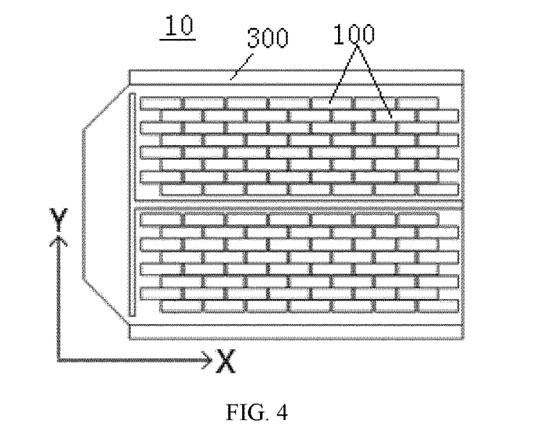
FIG. 4 is a schematic top view of a battery pack according to an embodiment of the present disclosure.
Figure 5:
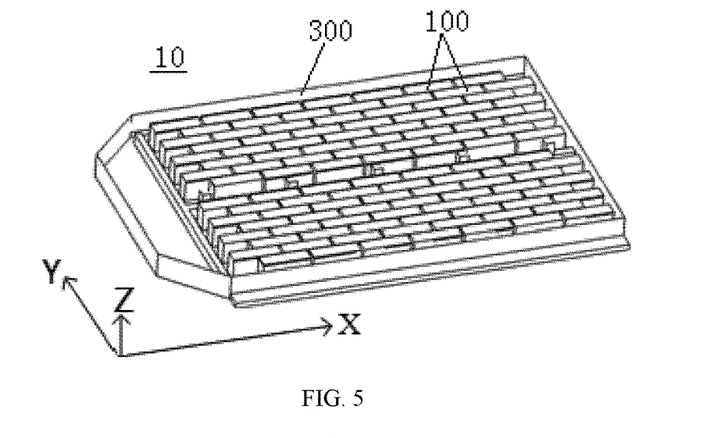
FIG. 5 is a schematic perspective view of the battery pack of FIG. 4.

In view of this, the present disclosure provides a battery pack 10. Referring to FIGS. 4 and 5, an embodiment of the battery pack 10 includes at least one layer of battery cells 100 in a height direction Z thereof.

Each layer of battery cells 100 includes a plurality of rows of battery cells 100. The battery cells 100 in each row are arranged end-to-end in a length direction X of the battery pack 10. The plurality of rows are arranged in a width direction Y of the battery pack 10. At least a part of the battery cells in each row are staggered with respect to corresponding battery cells in an immediately adjacent row in the width direction Y of the battery pack.

Figure 6:
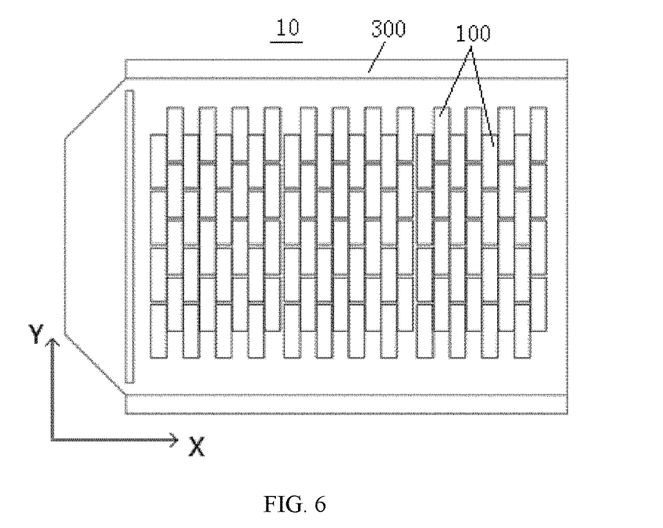
FIG. 6 is a schematic top view of a battery pack according to another embodiment of the present disclosure.

Alternatively or additionally, referring to FIG. 6, each layer of battery cells 100 includes a plurality of columns of battery cells 100. The battery cells 100 in each column are arranged end-to-end in the width direction Y of the battery pack 10. The plurality of columns are arranged in the length direction X of the battery pack 10. At least a part of the battery cells in each column are staggered with respect to corresponding battery cells in an immediately adjacent column in the length direction X of the battery pack.

The battery pack 10 can be used in an electric apparatus such as a vehicle or an aircraft. The vehicle includes, but is not limited to, a pure electric vehicle, a hybrid electric vehicle, or other vehicles using electric energy as power. The battery pack according to the present disclosure will be described in an electric vehicle as an example.

Throughout the specification, the height direction of the battery pack 10 is the same as a height direction of the vehicle. The length direction of the battery pack 10 is the same as a driving direction of the vehicle. The width direction of battery pack 10 is perpendicular to both the height direction and the length direction of the battery pack 10.

Each battery cell 100 has a first end and a second end opposite to the first end in a length direction of the battery cell 100. In the embodiment having the plurality of rows of battery cells 100, on the condition that the first end of one battery cell in one row is not in alignment with the first end of the corresponding battery cell in the immediately adjacent row in the width direction Y of the battery pack 10, and/or that the second end of one battery cell in one row is not in alignment with the second end of the corresponding battery cell in the immediately adjacent row in the width direction Y of the battery pack 10, these two battery cells are staggered with respect to each other in the width direction Y of the battery pack 10. Likewise, in the embodiment having the plurality of columns of battery cells 100, on the condition that the first end of one battery cell in one column is not in alignment with the first end of the corresponding battery cell in the immediately adjacent column in the length direction X of the battery pack 10, and/or that the second end of one battery cell in one column is not aligned with the second end of the corresponding battery cell in the immediately adjacent column in the length direction X of the battery pack 10, these two battery cells are staggered with respect to each other in the length direction X of the battery pack 10.

In the present disclosure, when the vehicle is subjected to a side pole impact or an undercarriage collision, due to the above-described staggered arrangement of the battery cells in the battery pack, the battery cells are more likely to deform or move, such as bend, rotate, shift, etc., causing the external impact energy transferred to a wider range throughout the battery cells, rather than concentrated in the impact zone. The diffusion of impact energy will alleviate the damage of the impact zone of battery pack. As a result, the risk of break, short circuit, and thermal runaway of the battery pack can be reduced, improving the safety performance of the battery pack.

The number of the layers of the batter cells 100 included in the battery pack 10 can be set according to actual needs. For example, one, two, three, or more layers of the batter cells 100 can be included in the battery pack 10. When the battery pack 10 includes more than one layer of the batter cells 100, a bracket can be disposed between two adjacent layers of the battery cells 100 to support the upper layer of the batter cells 100. The bracket can further facilitate the wiring of the upper layer of the batter cells 100 and the heat dissipation of the upper and lower layers of the battery cells 100.

The arrangement of the battery cells in respective layers can be set according to actual needs. In the embodiment as shown in FIG. 4 and FIG. 5, each layer of battery cells 100 includes a plurality of rows of battery cells 100, the plurality of rows are arranged along the width direction Y of the battery pack 10, and the battery cells 100 in each row are arranged end-to-end in the length direction X of the battery pack 10. In the embodiment as shown in FIG. 6, each layer of battery cells 100 includes a plurality of columns of battery cells 100, the plurality of columns are arranged along the length direction X of the battery pack 10, and the battery cells 100 in each column are arranged end-to-end in the width direction Y of the battery pack 10. In another embodiment, each layer of battery cells 100 includes both the plurality of rows of battery cells 100 as described above and the plurality of columns of battery cells 100 as described above. In yet another embodiment, the arrangement of the battery cells 100 in one layer is different from that in another layer.

The battery cells 100 in each of the plurality of rows, and/or in each of the plurality of columns, and/or in each of the at least one layer can have the same or different sizes, such as lengths, widths, and heights, which can be set according to the shape and the size of a housing 300 of the battery pack 100 to maximize the space efficiency of the housing 300.

Referring to FIGS. 4 to 6, the battery pack 100 can further include a housing 300 having an installation space therein. The battery cells 100 can be disposed in the installation space. The housing 300 can accommodate and protect the battery cells 100.

Figure 7:
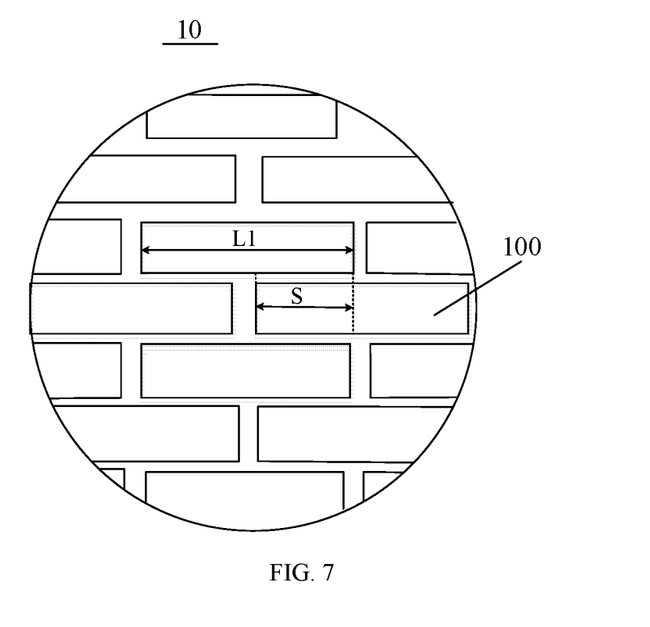
FIG. 7 and FIG. 8 are partial enlarged views of FIG. 4 with different indications.

Referring to FIG. 7, in some embodiments, an overlapping length S between each of the at least a part of the battery cells 100 in each row/column and the corresponding battery cell in the immediately adjacent row/column, which are staggered with respect to each other, can be larger than or equal to 1% of a length L1 and smaller than or equal to 99% of the length L1. By having the specific overlapping length S, the battery cells 100 are more likely to deform or move, such as bend, rotate, shift, etc., thereby widely spreading the external impact energy and the deformation energy of the battery pack 10 to a larger area. In an embodiment, the overlapping length S is larger than or equal to 10% of the length L1 and smaller than or equal to 90% of the length L1. For example, the overlapping length S can be 1%, 10%, 20%, 30%, 40%, 50%, 60%, 70%, 80%, 90%, and 99% of the length L1. The overlapping length S can be set according to actual needs.

The length L1 is defined as the maximum cell length in the two corresponding battery cells 100 located in adjacent rows/columns and staggered with respect to each other. When the two corresponding and staggered battery cells 100 in adjacent rows/columns have equal cell lengths, the length L1 is equal to the cell length of each of the two battery cells 100. When the two corresponding and staggered battery cells 100 in adjacent rows/columns have different cell lengths, the length L1 is equal to the cell length of the longer battery cell 100. For example, if a battery cell 100 in a current row/column is longer than the corresponding battery cell in the immediately adjacent row/column, the length L1 is equal to the cell length of the battery cell 100 in the current row/column. If a battery cell 100 in a current row/column is shorter than the corresponding battery cell in the immediately adjacent row/column, the length L1 is equal to the cell length of the corresponding battery cell in the immediately adjacent row/column.

Figure 8:
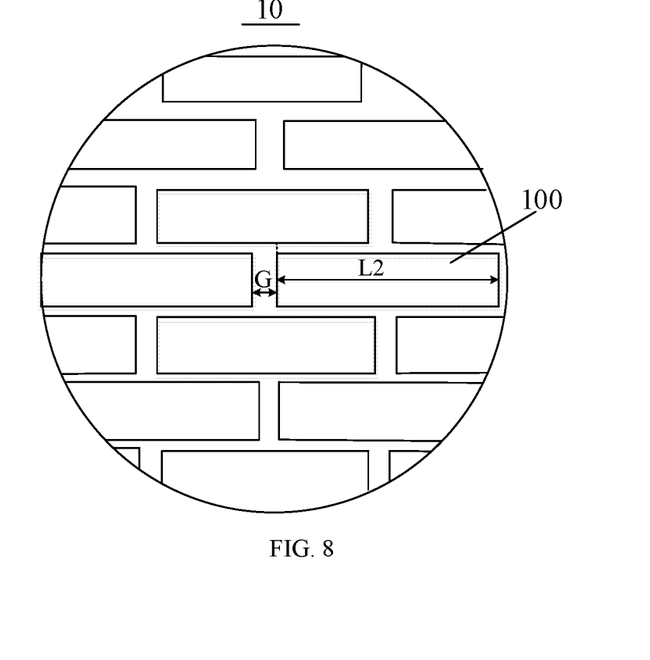

Referring to FIGS. 7 and 8, in an embodiment, any two adjacent rows/columns of the battery cells 100 can be spaced from each other by a first interval, which facilitates the wiring and the heat dissipation of the plurality of rows/columns of the battery cells 100. The first interval can be set according to actual conditions such as the sizes and the wiring requirements of the battery cells 100 and is not specifically limited herein.

Referring to FIGS. 7 and 8, in an embodiment, two adjacent battery cells 100 in each row/column can be spaced from each other by a second interval G, which not only provides space to receive the thermal expansion of the battery cells 100, but also facilitates the heat dissipation of the battery cells 100.

In some embodiments, the second interval G is larger than or equal to 0.1% of a length L2 and smaller than or equal to 10% of the length L2. The length L2 is defined as the maximum cell length in the two adjacent battery cells 100 defining the second interval G in the same row/column. If the two adjacent battery cells 100 in the same row/column have equal cell lengths, the length L2 is equal to the cell length of each of the two adjacent battery cells 100. If the two adjacent battery cells 100 in the same row/column have different cell lengths, the length L2 is equal to the cell length of the longer battery cell 100 in the two adjacent battery cells 100. The second interval G can be set according to actual conditions. For example, the second interval G can be 0.1%, 1%, 2%, 3%, 4%, 5%, 6%, 7%, 8%, 9%, and 10% of the length L2.

Figure 11:
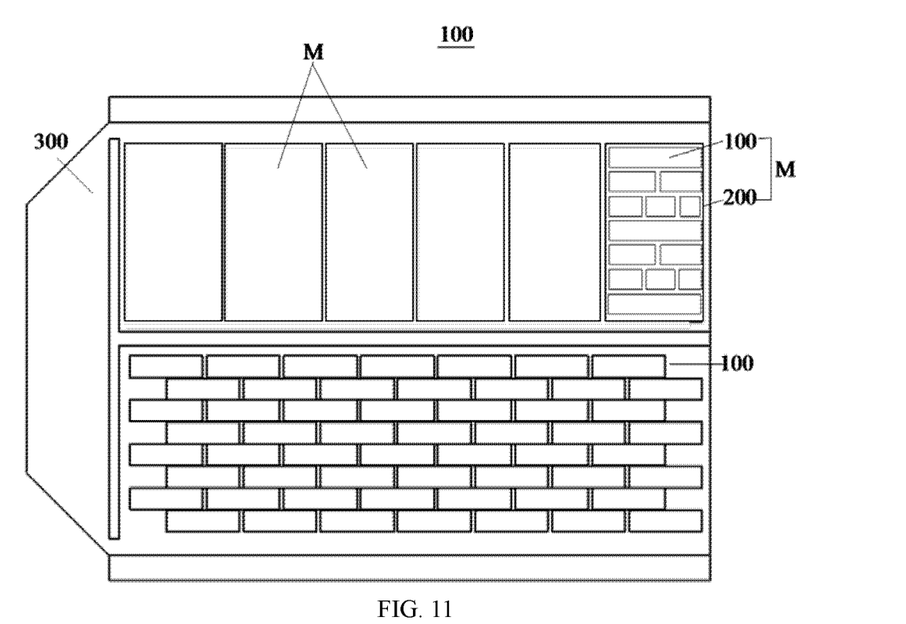
FIG. 11 is a schematic top view of a battery pack according to another embodiment of the present disclosure.
Figure 12:
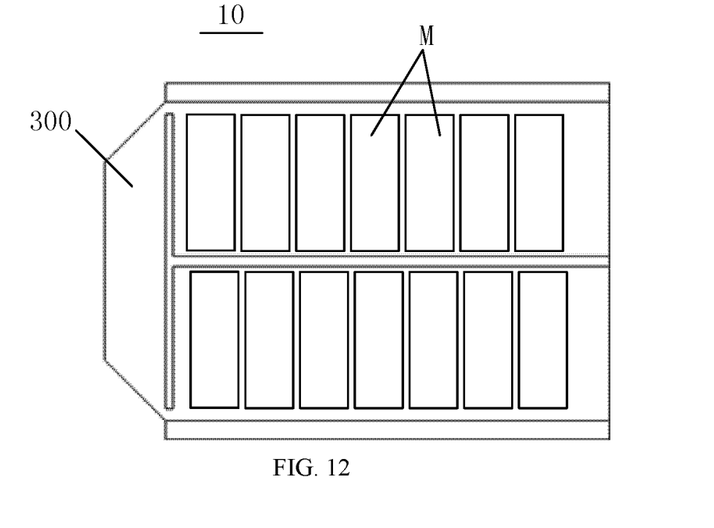
FIG. 12 is a schematic top view of a battery pack according to yet another embodiment of the present disclosure.
Figure 13:
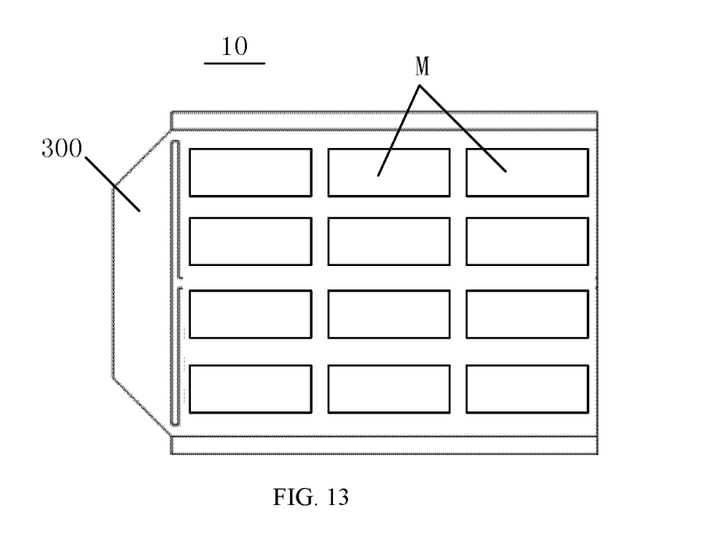
FIG. 13 is a schematic top view of a battery pack according to still another embodiment of the present disclosure.

Referring to FIGS. 11 to 13, in some embodiments, the battery pack 10 further includes at least one module casing 200 enclosing at least a part of the battery cells 100. The battery cells 100 enclosed in the same module casing 200 can be in the same layer or in a plurality of stacked layers. The module casing 200 and the battery cells 100 enclosed by the module casing 200 constitute a battery module M. The installation of the battery cells 100 in the housing 300 is facilitated by using the battery module M.

In the present disclosure, the battery cells 100 in either or both the battery module M and the battery pack 10 can be in the staggered arrangement as described above. Furthermore, the battery modules M in the battery pack 10 can also be in the staggered arrangement.

As shown in FIGS. 12 and 13, the battery pack 10 can include a plurality of battery modules M. The plurality of battery modules M can be arranged in rows in the width direction of the battery pack 10, wherein the battery modules M in each row are arranged end-to-end in the length direction of the battery pack 10; and/or the plurality of battery modules M can be arranged in columns in the length direction of the battery pack 10, wherein the battery modules M in each column are arranged end-to-end in the width direction of the battery pack 10. Two adjacent rows and/or columns of battery modules M can be spaced from each other. Two adjacent battery modules M in each row/column can also be spaced from each other. In this way, the wiring and the heat dissipation of the battery cells in the plurality of battery modules M are facilitated.

The battery cells 100 in the same battery module M or the same battery pack 10 can have the same size or different sizes. In an embodiment, as shown in FIG. 11, the battery cells 100 in the same battery module M have different sizes such that the outmost ends of the outmost battery cells 100 in the battery module M are aligned with each other in the staggered direction of the battery cells 100, thereby improving the space utilization of the module casing 200.

The side pole impact and the undercarriage collision are simulated and analyzed for the battery pack 20 in related art and the battery pack 10 according to the present disclosure. In the simulation, the battery pack 10 is substantially the same as the battery pack 20 (in which all of the battery cells have the same size), except that the battery cells in the battery pack 10 are in alignment with each other in the length direction thereof while staggered with respect to each other in the width direction thereof (taking the overlapping length S=50%×L1 as an example), and the battery cells in the battery pack 20 are in alignment with each other in both the length direction and the width direction thereof.

Figure 9:
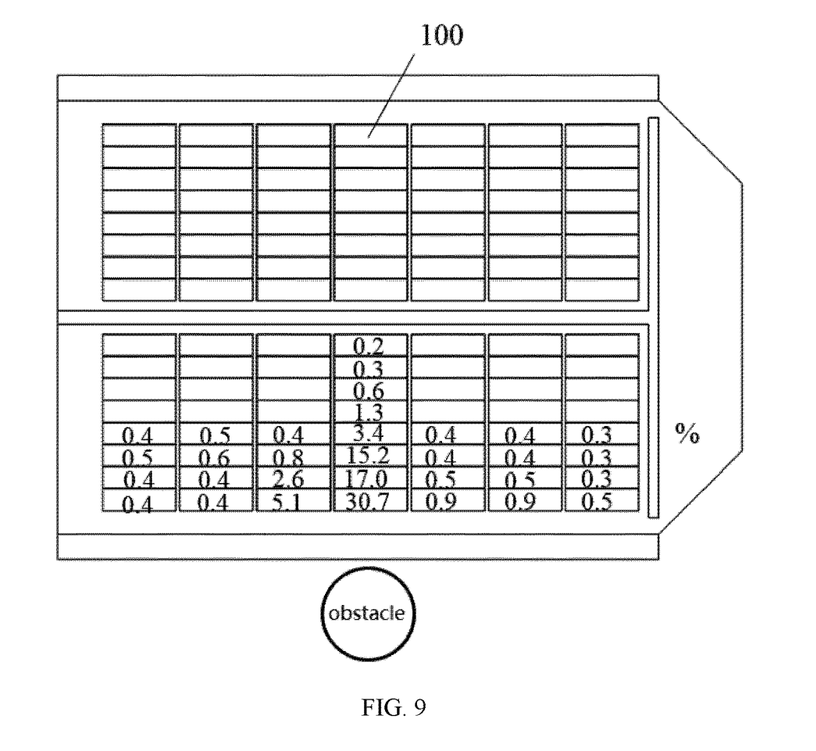
FIG. 9 shows energy absorption percentages of jellyrolls of battery cells of the battery pack in related art in the side collision situation.
Figure 10:
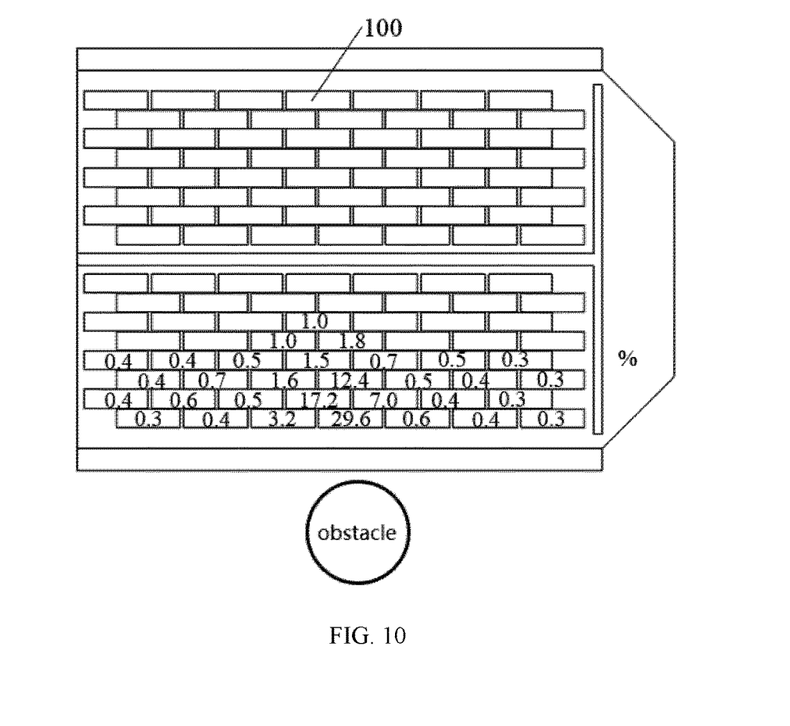
FIG. 10 shows energy absorption percentages of jellyrolls of battery cells of the battery pack according to an embodiment of the present disclosure in the side collision situation.

FIGS. 9 and 10 show percentage numbers of energy dissipated by jellyrolls of battery cells in the battery pack 20 and the battery pack 10 with staggered configuration in the side pole impact. The energy dissipation ratios are individual by battery cells near the impact zone. In the battery pack 10 with the staggered configuration, the individual jellyroll with the most severe energy concentration on the impact zone accounted for 29.6% of total jellyrolls energy dissipation, which reduced the damage concentration by the battery pack 20 (30.7% of total jellyrolls energy dissipation). Moreover, the battery pack 10 with the staggered configuration have 9 jellyrolls with energy dissipation greater than 1% of total jellyrolls energy dissipation, while the battery pack 20 have only 7 jellyrolls with energy dissipation greater than 1% of total jellyrolls energy dissipation.

The normalized plastic deformation energies of the whole battery packs 10 and 20 and of the jellyrolls of the battery cells 100 and 20a in the battery packs 10 and 20 are listed in Table 1. It can be seen that the plastic deformation energy of jellyrolls of the battery cells 100 in the battery pack 10 is significantly decreased as compared to the plastic deformation energy of the jellyrolls of the battery cells 20a in the battery pack 20 both in the side pole impact and the undercarriage collision, especially in the undercarriage collision. The plastic deformation energy of an article refers to the energy consumed by the plastic deformation of the article or the energy to be absorbed by the article to cause the plastic deformation thereof. The smaller the plastic deformation energy of an article, the more easily the article deforms.

The plastic deformation and energy dissipation of battery cells in the battery pack 10 and the battery pack 20 in the side pole impact and the undercarriage collision were compared in the above. The results have shown that the staggered configuration of battery cells are more likely to bend, rotate and deform, causing the impact energy transferred to a wider range throughout the battery cells. The diffusion of impact energy will alleviate the damage of impact zone of battery pack and improve the safety performance of battery pack.

TABLE 1

|  | Plastic deformation energy of whole battery pack inside pole impact | Plastic deformation energy of jellyrolls in side pole impact | Plastic deformation energy of whole battery pack in undercarriage collision | Plastic deformation energy of jellyrolls in undercarriage collision |
| --- | --- | --- | --- | --- |
| Battery pack 20 | 100% | 100% | 100% | 100% |
| Battery pack 10 | 100.2% | 74.2% | 69.5% | 60.5% |

The present disclosure further provides an electric apparatus including the above described battery pack 10.

The electric apparatus can be a vehicle, an aircraft, or other electric apparatus. The vehicle includes, but is not limited to, a pure electric vehicle, a hybrid electric vehicle, or other vehicles with the electric energy as power.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

The above-described embodiments are only several implementations of the present disclosure, and the descriptions are relatively specific and detailed, but they should not be construed as limiting the scope of the present disclosure. It should be understood by those of ordinary skill in the art that various modifications and improvements can be made without departing from the concept of the present disclosure, and all fall within the protection scope of the present disclosure. Therefore, the patent protection of the present disclosure shall be defined by the appended claims.

What is claimed is:

1. A battery pack, comprising at least one layer of battery cells in a height direction of the battery pack, wherein each of the at least one layer of battery cells comprises either or both of a plurality of rows of battery cells and a plurality of columns of battery cells,
   the battery cells in each of the plurality of rows are arranged end-to-end in a length direction of the battery pack, the plurality of rows are arranged in a width direction of the battery pack, and at least a part of the battery cells in each of the plurality of rows are staggered with respect to corresponding battery cells in an immediately adjacent row of battery cells;
   the battery cells in each of the plurality of columns are arranged end-to-end in the width direction of the battery pack, the plurality of columns are arranged in the length direction of the battery pack, and at least a part of the battery cells in each of the plurality of columns are staggered with respect to corresponding battery cells in an immediately adjacent column of battery cells.

2. The battery pack of claim 1, wherein an overlapping length S between each of the at least a part of the battery cells in each row or column and the corresponding battery cell in the immediately adjacent row or column is larger than or equal to 1% of a length L1 and smaller than or equal to 99% of the length L1, wherein the length L1 is a maximum battery cell length in the each row or column and the immediately adjacent row or column.

3. The battery pack of claim 1, wherein any two adjacent rows or columns of battery cells are spaced from each other.

4. The battery pack of claim 1, wherein any two adjacent battery cells in each of the plurality of rows or columns are spaced from each other.

5. The battery pack of claim 4, wherein an interval between any two adjacent battery cells in each of the plurality of rows or columns is larger than or equal to 0.1% of a length L2 and smaller than or equal to 10% of the length L2, wherein the length L2 is a maximum battery cell length in the two adjacent battery cells in the each of the plurality of rows or columns.

6. The battery pack of claim 1, comprising at least one module casing enclosing a number of battery cells of the at least one layer of battery cells, wherein each of the at least one module casing and the battery cells enclosed thereby constitute a battery module.

7. The battery pack of claim 6, comprising either or both of a plurality of the battery modules arranged in rows in the width direction of the battery pack and a plurality of the battery modules arranged in columns in the length direction of the battery pack, wherein the battery modules in each of the rows are arranged end-to-end in the length direction of the battery pack, and the battery modules in each of the columns are arranged end-to-end in the width direction of the battery pack.

8. The battery pack of claim 1, further comprising a housing, wherein the at least one layer of battery cells are contained in the housing.

9. The battery pack of claim 1, wherein all of the battery cells in each of the plurality of rows are staggered with respect to the corresponding battery cells in the immediately adjacent row of the plurality of rows.

10. The battery pack of claim 1, wherein all of the battery cells in each of the plurality of columns are staggered with respect to the corresponding battery cells in the immediately adjacent column of the plurality of columns.

11. The battery pack of claim 1, comprising a plurality of the at least one layer of battery cells in the height direction of the battery pack.

12. The battery pack of claim 11, wherein any two adjacent layers of the plurality of the at least one layer are spaced from each other in the height direction of the battery pack.

13. An electric apparatus, comprising the battery pack of claim 1.

14. The electric apparatus of claim 13, wherein the electric apparatus is an electric vehicle.

* * * * *